March 24, 1959
F. C. E. MANNERSTEDT
2,878,796
VALVE TIMING GEAR FOR INTERNAL COMBUSTION ENGINES
Filed May 29, 1956
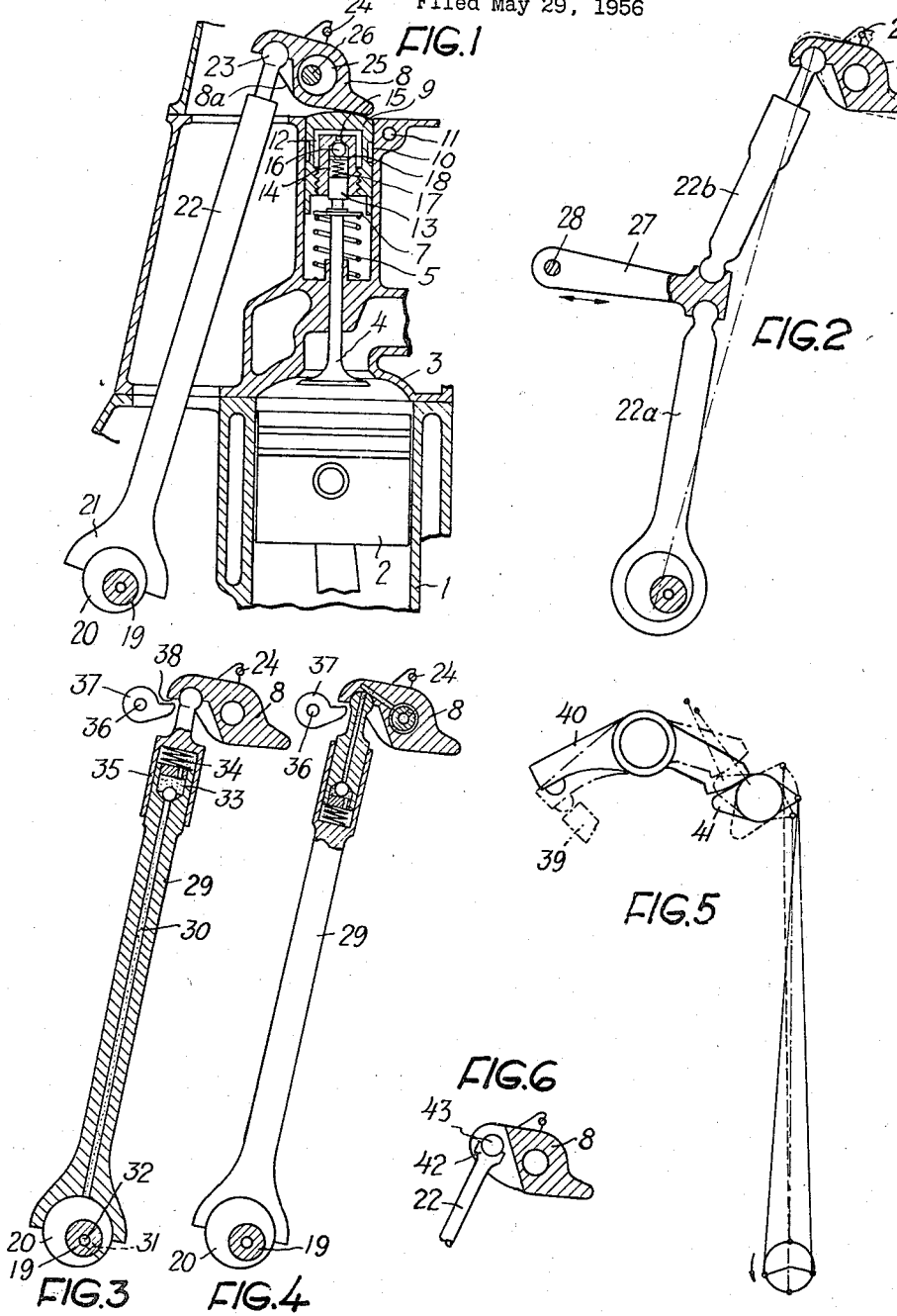

United States Patent Office 2,878,796
Patented Mar. 24, 1959

2,878,796

VALVE TIMING GEAR FOR INTERNAL COMBUSTION ENGINES

Folke Carl Erik Mannerstedt, Hagersten, Sweden

Application May 29, 1956, Serial No. 588,124

Claims priority, application Sweden June 1, 1955

10 Claims. (Cl. 123—90)

As a rule, spring-actuated valves are used in internal combustion engines, the spring being adapted to return the valve into the position of closure after the opening movement. The spring has to be dimensioned in dependence on the occurring forces of the masses so as to be capable of returning the whole valve mechanism at all speeds, in a manner such that a contact is always maintained between the parts incorporated into the mechanism as well as between the mechanism and the driving cam. In case of internal combustion engines with side valves, the mass of the valve mechanism is relatively small, for which reason the springs may be comparatively weak.

Nowadays, overhead valves have found an ever increasing use, whereby, inter alia, the combustion space may be formed more favourably. Furthermore, there is a tendency toward high engine speeds, inasmuch as the maximum output of the engine is augmented with the maximum speed.

In a high-speed overhead valve engine with an underlying cam shaft, the mass of the valve mechanism is relatively great, for which reason strong valve springs have to be resorted to. Consequently, the pressure between the cam and the push member cooperating therewith becomes high. The tendency toward an increasing speed involves a restricting factor, inasmuch at it becomes difficult to maintain a satisfactory oil film at the contact point, which results in that at a certain number of revolutions the friction work becomes so great that the cooperating surfaces are heated and tarnished so as to wear down rapidly, so that the parts become unserviceable and call for an exchange.

As a measure of the friction work one may use the product of the perpendicular pressure at the contact point between the cam and the push member and the sliding velocity of said point during the contact. It should be observed in this respect that said value does not have its maximum at the maximum speed of the engine, inasmuch as the spring pressure is counteracted by the mass forces at high speeds.

A method of avoiding or reducing the drawbacks inherent in said heating consists in providing the engine with an overhead cam shaft, whereby the mass of the valve mechanism and thus also the spring pressure can be considerably reduced by the elimination of push rods and so forth. On the other hand, further problems then present themselves by the overhead cam shaft having to be operated in a satisfactory manner, it being necessary to use a transmission gear between the engine shaft and the cam shaft which is very accurately constructed, so that the timing of the valves becomes exact. The construction consequently becomes complicated and expensive.

The present invention relates to a valve timing gear, wherein the above-mentioned disadvantages are avoided, and the main features of the invention may be said to reside in the following. When a cam actuates the push member, this will take place in the beginning of the opening movement at a certain rolling motion between the two cooperating surfaces, but toward the end of the opening movement the cam top rapidly sweeps over the surface of the push member while the latter is heavily loaded by the spring pressure. The resulting product of the pressure and speed consequently becomes large. According to the invention, a control shaft is used in place of the cam shaft, said control shaft being provided with eccentrics or cranks, from which the movement is derived with the aid of a connecting rod being connected to an oscillating cam cooperating with a corresponding surface on the valve stem or on a motion-transmitting member arranged between the valve stem and the connecting rod. After the cam has lifted the valve into its fully open position, its angular speed has been reduced to zero by reason of the crank movement, and on both sides of this position the speed is comparatively low. On account of this the product of the spring pressure and the speed also becomes low, for which reason inadmissible values of said product can be avoided even at high maximum engine speeds. Otherwise, the cam is formed in such manner that a more or less pure rolling movement will be obtained, the same as with an ordinary cam, at least in the beginning of the opening movement and near the end of the closing movement, such rolling operation being aimed at also during the whole of the working cycle. However, a pure rolling movement over the whole cycle would involve a bulky construction, and inasmuch as a certain sliding movement may be permitted without disadvantage, as long as pressure and speed are kept within values hitherto proved by experience to be harmless, there is no reason to complicate the construction.

The invention will be explained more closely in the following with reference to the accompanying drawings illustrating a few forms of embodiment of the same. Fig. 1 shows a section through an engine cylinder with a valve mechanism constructed according to the invention, and Figs. 2–6 show modified embodiments of the valve mechanism.

The cylinder of the internal combustion engine shown in Fig. 1 is designated by 1, and the piston thereof is denoted by 2. Arranged in the cylinder head 3 is a valve 4, which is provided in known manner with a closing spring 5 mounted under pressure between the bottom of a cylindrical recess 6 in the head and a washer 7 attached to the stem of the valve 4.

The valve 4 is adapted to be actuated by a cam 8 of a kind to be described more closely in the following. The cam 8 actuates the free end of the stem of the valve 4 over a guide plunger or push member 9, which may be of a type known per se. In the example, a hydraulic plunger is shown. The peripheral portion of the guide plunger 9 has a groove 10 which communicates with a pressure oil conduit 11 and with a space 12 within the plunger, said space being thus always kept filled with oil. Provided in the guide plunger is a pressure plunger 13 which is displaceable in a cylinder 14, the space of said cylinder 14 communicating with the cylinder space 12 through an opening 15 controlled by a non-return valve in the form of a ball 16. The cylinder 14 also has a relatively weak spring 17 inserted therein, said spring being mounted under pressure between the plunger 13 and a perforated plate 18 inserted into the cylinder 14 and serving to keep the ball 16 in its proper position.

The hydraulic push member described functions, as is well known, in a manner such that the length thereof is automatically adapted to the available space.

The engine is taken to be a four-stroke engine and is provided with a control shaft 19 which is driven by the crank shaft at half the number of revolutions of the latter shaft. The control shaft carries an eccentric 20 which is semi-circularly surrounded by the upper bearing member 21 of a connecting rod 22. The upper end of this connecting rod is formed with a ball 23 resting in a corresponding bearing member forming part of the cam 8 which is formed as a lever having an oscillatory movement imparted thereto. The lever is subjected to the force of a diagrammatically indicated return spring 24 tending to turn the cam 8 in a counter-clockwise direction, whereby a contact is always maintained between the connecting rod 22 and the eccentric 20 and the cam 8.

The cam 8 is mounted on an eccentric 25, which is carried by a rotatable shaft 26. Upon rotation of the shaft 26 the axis of oscillation of the cam 8 will thus be displaced toward and from the push member 9.

As pointed out in the preamble, difficulties are met with under certain circumstances at the contact point between the cam and the push member in high-speed engines as hitherto known. In the construction now described, these difficulties are eliminated by the provision of a control shaft provided with an eccentric in place of the ordinary cam shaft, so that a crank movement is obtained and conventional bearing means may be used for the ends of the connecting rod 22. The critical point in the construction described could be expected to be the contact point between the cam 8 and the push member 9, but it will be found that the product of the pressure and speed decisive for the friction work and touched upon in the preamble keeps at a very low value. The cam 8 may be formed substantially in the same manner as a cam normally used in internal combustion engines, so that a more or less pure rolling movement will be obtained between the two contact surfaces, at least at the beginning of the opening movement and near the end of the closing movement. Add to this that the angular speed of the cam is diminished and reduced to zero at the termination of the opening movement, when the spring pressure is at a maximum, which lowers the value of said product. An example of calculation shows that the valve mechanism described renders possible a considerable increase of the maximum speed of a known engine, without the product of the sliding speed and the pressure exceeding admissible values. If it be assumed that said product should not exceed 170 kilogram-meters per second, calculations show that a overhead valve engine with an underlying cam shaft and with a maximum speed of 5000 revolutions per minute, which at about 3000 revolutions per minute might reach the proximity of the friction number 170, can with the same valve springs but constructed as an overhead valve engine with overhead cam shaft be run at a maximum speed of 7000 revolutions per minute, without the maximum value of 170 of the friction number being exceeded. If the engine instead comprises a valve mechanism according to the present invention, the same high maximum speed will be attained with the use of the same springs for the valves, but the maximum friction number will then amount only to 60 kgm./sec., so that the problem of detrimental heating of the contact surfaces is entirely eliminated.

It should also be pointed out that in the construction according to the invention the valve spring 5 only requires to be dimensioned to return the valve and the push member, whereas the return valve 24 takes care of the return movement of the cam 8 and the connecting rod 22. The pressures at the bearings 21 and 23 at the ends of the connecting rod do not offer any difficulties to overcome, the combined pressure of the springs 5 and 24 being consequently harmless, whereas in an overhead valve engine with an underlying cam shaft of the ordinary type great difficulties present themselves at the contact point of the cam.

It has been found suitable to form the cam 8 in such manner that the opening and closing movements of the valve are completed within an angular movement of the cam amounting to 15–60° and being preferably between 20 and 35°. The angle may advantageously have a value of 25–30°. The total angular movement of the cam is preferably between 60° and 140°. From Fig. 1 it also appears that the opening movement is terminated long before the radius through the oscillatory center of the cam and through the contact point between the cam and the push member has become parallel to the direction of movement of the push member, for which reason too the sliding movement becomes small. With a rotating cam, a very high sliding velocity occurs at the moment when the cam top proper sweeps over the corresponding contact surface.

At a low speed of an engine, the valves should be kept open for a comparatively short time to provide for a uniform and smooth operation of the engine. With an increasing speed, the valves should be kept open longer to permit of complete charging and emptying of the cylinder. With an ordinary engine a compromise is made such that the opening periods are adapted to a certain average speed of the engine, which will thus run less satisfactorily at low and high speeds. Fig. 1 shows an arrangement whereby the valve timing may be altered during operation of the engine. If the shaft 26 be turned in a clockwise direction from the position shown, the oscillatory axis of the cam 8 will be lowered, whereby the valve will be kept open during a greater angle of the crank shaft, whereas turning of the shaft 26 in a counterclockwise direction brings about a shortening of the opening period. It will be understood that by the arrangement of a centrifugal governor, for example, an automatic adjustment of the valve timing in dependence on the speed is obtainable. On the other hand, it may frequently be sufficient to shift the shaft 26 manually, for instance into three different positions of adjustment to adapt the engine to the driving conditions. The hydraulic push member 9 adapts itself automatically to the distance from the base circle 8a of the cam 8 varying during the adjustment, against which circle the push member 9 bears under the small pressure of the spring 17 during the idle stroke of the cam.

The circumstance that the connecting rod 22 need not be provided with a lower bearing member surrounding the eccentric 20 entails the advantage that it is very easy to assemble and to disassemble the same, for which reason the construction is from this point of view fully comparable with an ordinary overhead valve system with push rods.

Fig. 2 shows a further construction of a device to adjust the valve timing. In this case, the connecting rod 22 is divided into two members 22a and 22b pivoted to one another, the pivot between them being located on an arm 27 adapted to be displaced back and forth, said arm being also swingable about a shaft 23. The mode of operation of the device is believed to be entirely clear from the drawing.

In Fig. 3, the rigid connecting rod 22 according to Fig. 1 has been replaced by a connecting rod 29 which is provided with a hydraulic device of substantially the same type as the push member 9 in Fig. 1. The connecting rod 29 has a through-passage 30 which is supplied with oil through a passage 31 during the rotation of the eccentric 20, said passage communicating with an oil supply passage 32 in the control shaft 19. Provided at the upper end of the connecting rod 29 is a pressure space 33 and a spring 34, which latter tends to move the cylinder-shaped end portion 35 of the connecting rod in an upward direction.

Secured to a rotatable shaft 36 in the proximity of the cam 8 is a stop member 37 adapted to cooperate with an abutment surface 38 on the cam. The stop member 37 limits the rotary movement of the cam 8 in counter-clockwise direction. If the abutment surface 38 bears on the member 37 already before the connecting rod 29 has reached its lower dead center position, the spring 34 will displace the end portion 35 upwardly, so that the connecting rod is extended. At the next stroke the cam will lift the valve for a longer distance than previously. On the other hand, if the stop member 37 is turned away from its contact with the abutment surface 38, the continuously acting pressure on the end portion 35 will, comparatively soon at least, bring about a shortening of the connecting rod by reason of leakage from the pressure space 33, whereby the opening period is again reduced to a value corresponding to the new position of the stop member 37.

The embodiment according to Fig. 4 differs from that according to Fig. 3 only in that the hydraulic device is adapted to be supplied with oil through the shaft of the cam 8.

A common feature of the illustrated arrangements for the adjustment of the opening period is that the lift of the valve is increased with increasing opening period. At partial load and low speeds, which are most frequently met with, the lift is lower, for which reason the valve springs, and the whole mechanism for that matter, become strained to a lesser degree, which is highly favourable from the point of view of wear. A high-speed engine built on the hitherto common principles will always have to operate with a highly strained valve mechanism.

It will also be understood that an alteration of the opening period may be undertaken by individual adjustment of the lengths of all connecting rods, if the latter are provided with a bearing ball screwed into the ends of the connecting rods and provided with a stop nut. Such an adjustment is relatively time-wasting, however.

Fig. 5 is a diagrammatic representation of a valve gear of a modified construction. Here, the end of the only partly indicated valve stem 39 is actuated by one end of a rocker 40, the other end of which is adapted to be actuated by a cam 41 having an oscillatory movement imparted to the same from an eccentric or a crank device, as was the case with the cam 8 in Fig. 1–4. Sometimes, the construction according to Fig. 5 might be found preferable. The mode of operation equal in all essentials the mode of operation of the arrangement according to Fig. 1, with the exception that the surface cooperating with the cam 41 performs a swinging movement instead of the rectilinear movement of the push member 9. Thus it holds true in this case too that the cam 41 is operative only during 15 to 60° of its rotary movement in either direction.

When a hydraulic element is used in the push member in accordance with Fig. 1, the play between the push member and the base circle of the cam is no matter of consideration. In a ordinary push member, on the other hand, the play has to be adjusted to a normal value, which may be effected for instance by the arrangement of shims underneath the bearing bracket carrying the cam. In this case each cam should be mounted in its special bearing bracket to make an individual adjustment possible. In the embodiment shown in Fig. 1 there can be provided a common shaft for all cams.

In Figs. 1 to 5, the upper end of the connecting rod is devised as a ball engaging a corresponding spherically shaped socket in the cam 8.

In many cases it may be more suitable to construct the pivotal connection in accordance with Fig. 6 in which the upper end of the rod 22 forms part of a journal-bearing 42 engaging a stud 43 which is secured to the cam 8. In this case, the cam 8 has a bifurcated portion between the limbs of which the stud 43 is provided.

In the foregoing, the invention has been described as applied to a four-stroke engine. However, according as valves are used in a two-stroke engine, the invention is also applicable to an engine of this type. If desired, the end of the connecting rod cooperating with the eccentric may be formed so as entirely to enclose the eccentric, and it is also possible to apply the invention in such manner that the valves become positively controlled, the pivotal connections between the various members having then to be formed in a correspondingly suitable manner. The cam and the surface of the push member or rocker cooperating therewith may be formed in the ordinary manner, so that a cam with a straight face cooperates with a convex surface, and a convex cam with a plane surface on the push member, and it is even conceivable to contemplate a cooperation between a convex surface on one member and a concave surface on the other member. Due to the great radii of curvature, the mechanical resistance of the contacting faces will be very great.

As will appear from the foregoing, the invention is not restricted to the forms of embodiment described above and shown in the drawings, but may be modified in its details within the scope of the appended claims.

What I claim is:

1. In a valve timing gear for high-speed internal combustion engines with spring-loaded overhead valves, and having a control shaft, an eccentric carried by said control shaft and a connecting rod actuated by said eccentric, in combination, an oscillating rocker arm having an operative cam surface, said rocker arm being positioned to be engaged by said connecting rod to receive motion therefrom and said operative surface being adapted to engage a corresponding surface associated with the stem of the valve, the cam surface being formed and positioned in such manner that the entire opening movement of the valve is completed during an angular movement of the rocker arm amounting to 15–60°.

2. A valve timing gear according to claim 1, wherein said corresponding surface is provided by a motion transmitting member comprising a hydraulic element of a variable length consisting of a plunger and a cylinder, said element being adapted to eliminate plays in the mechanism but to transmit movement to the stem of the valve.

3. A valve timing gear as defined in claim 1 further comprising means for varying the period during which the valve is open.

4. A valve timing gear as defined in claim 1, wherein said rocker arm is carried by a shaft which is displaceable relative to the surface cooperating with the cam surface.

5. A valve timing gear as defined in claim 1, wherein the connecting rod comprises two members pivoted to one another, the pivot between said members being displaceable in a direction substantially at right angles to the main direction of the connecting rod to permit variation of the effective connecting-rod length.

6. A valve timing gear as defined in claim 1, wherein the connecting-rod comprises a hydraulic element, and an adjustable stop member is provided to limit the rocking movement of the rocker arm in the direction of closing of the valve.

7. A valve timing gear as defined in claim 1, further comprising a rocker actuated by said rocker arm, said rocker being positioned to transmit the movements of the rocker arm to the valve.

8. A valve timing gear as defined in claim 1, further comprising a return spring to return at least the rocker arm and the connecting-rod during the closing movement of the valve.

9. A valve timing gear as defined in claim 1, wherein the connecting-rod is formed with a bearing surface adapted to engage the eccentric, said bearing surface encompassing at most 180° of the eccentric.

10. A valve timing gear as defined in claim 1, wherein a radius from the oscillatory center of the rocker arm to the contact point between the cam surface and the surface cooperating therewith always makes an angle of at least 20° with the direction of movement of said last-named surface.

(References on following page)

References Cited in the file of this patent

UNITED STATES PATENTS

| | | |
|---|---|---|
| 1,515,344 | Joy | Nov. 11, 1924 |
| 1,660,315 | Beaulieu | Feb. 28, 1928 |
| 1,792,836 | Handwerker | Feb. 17, 1931 |
| 1,812,787 | Hewitt | June 30, 1931 |
| 2,354,988 | Fix | Aug. 1, 1944 |
| 2,380,051 | Kettering | July 10, 1945 |
| 2,410,660 | Howard | Nov. 5, 1946 |
| 2,565,022 | Hattink | Aug. 21, 1951 |
| 2,720,874 | Brooks | Oct. 18, 1955 |
| 2,773,490 | Miller | Dec. 11, 1956 |

FOREIGN PATENTS

| | | |
|---|---|---|
| 369,394 | Germany | Feb. 19, 1923 |